US008841228B2

United States Patent
Smegal et al.

(10) Patent No.: US 8,841,228 B2
(45) Date of Patent: Sep. 23, 2014

(54) COMPOSITION AND A METHOD OF MAKING AND USE OF SUCH COMPOSITION

(75) Inventors: John Anthony Smegal, Houston, TX (US); Alexei Grigorievich Gabrielov, Houston, TX (US); Peter Wolohan, Katy, TX (US); William Douglas Gillespie, Katy, TX (US)

(73) Assignee: Shell Oil Company, Houston, TX (US)

( * ) Notice: Subject to any disclaimer, the term of this patent is extended or adjusted under 35 U.S.C. 154(b) by 276 days.

(21) Appl. No.: 13/367,935

(22) Filed: Feb. 7, 2012

(65) Prior Publication Data

US 2013/0199969 A1     Aug. 8, 2013

(51) Int. Cl.
*B01J 31/02* (2006.01)
*C10G 45/06* (2006.01)
*C10G 45/04* (2006.01)

(52) U.S. Cl.
USPC ........... 502/150; 208/217; 208/213; 502/167; 502/168

(58) Field of Classification Search
None
See application file for complete search history.

(56) References Cited

U.S. PATENT DOCUMENTS

| 7,235,173 | B2 | 6/2007 | Diehl et al. | 208/216 R |
|---|---|---|---|---|
| 2007/0090023 | A1* | 4/2007 | Soled et al. | 208/209 |
| 2009/0038993 | A1 | 2/2009 | Gabrielov et al. | 208/243 |
| 2010/0236988 | A1 | 9/2010 | Gabrielov et al. | 208/217 |
| 2011/0108461 | A1 | 5/2011 | Gabrielov et al. | 208/112 |
| 2011/0294656 | A1* | 12/2011 | Soled et al. | 502/167 |
| 2011/0294657 | A1* | 12/2011 | Soled et al. | 502/167 |

* cited by examiner

*Primary Examiner* — Melvin C Mayes
*Assistant Examiner* — Douglas Call
(74) *Attorney, Agent, or Firm* — Charles W. Stewart

(57) ABSTRACT

A composition and method of making such a composition that has application in the hydroprocessing of hydrocarbon feedstocks. The method comprises selecting an organic additive by the use of a correlation model for predicting catalytic activity as a function of a physical property that is associated with the organic additive and incorporating the organic additive into a support material to provide the additive impregnated composition.

10 Claims, 1 Drawing Sheet

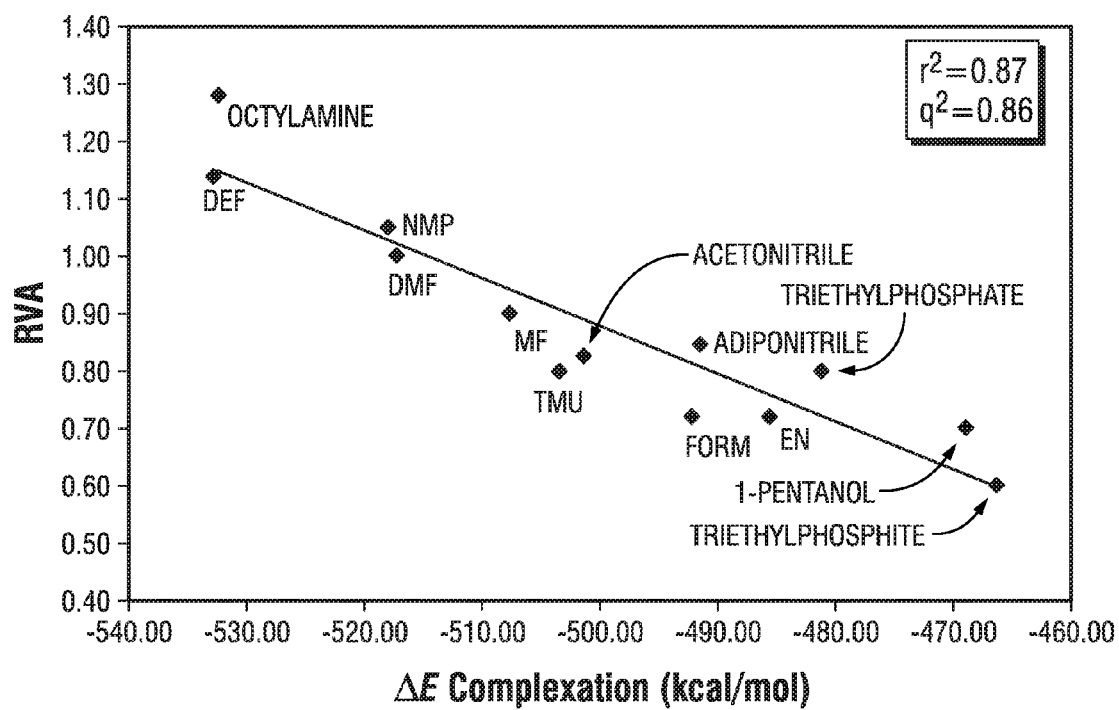

US 8,841,228 B2

COMPOSITION AND A METHOD OF MAKING AND USE OF SUCH COMPOSITION

This invention relates to a composition that is impregnated with an organic additive that is selected by utilizing a correlation model, a method of making such a composition, and its use in the catalytic hydroprocessing of hydrocarbon feedstocks.

With the increasingly more stringent requirements for reducing the levels of sulfur and nitrogen contained in petroleum derived hydrocarbon product streams there has been an ongoing effort to find new or improved hydroprocessing catalyst formulations and products that may suitably be used to more economically provide for the required sulfur and nitrogen reductions in the hydroprocessing of such petroleum derived hydrocarbon streams.

Typical hydroprocessing catalysts known in the art can include a Group VI metal (Mo and/or W) and a Group VIII (Co and/or Ni) as active components which are supported on an inorganic oxide support material. These catalyst components may be combined and treated in a many different ways to give catalyst compositions having certain desired properties.

Disclosed in the art are certain hydrotreating catalyst compositions that have incorporated in them various types of organic additive compounds used for the purpose of improving the hydrogenation catalytic activity of the compositions. Examples of such compositions are disclosed in U.S. Pat. No. 7,235,173. This patent discloses a hydrotreating catalyst containing a group VIB and/or a group VIII metal with an organic compound as an additive. The organic additive is a compound that contains at least one nitrogen atom and corresponds to a specifically defined generic formula.

The catalyst of the '173 patent is prepared by incorporating the hydrogenation metals into a matrix material, such as by ion exchange or dry impregnation of the substrate followed by a calcination. The organic compound may be introduced into the catalyst composition by dry impregnation or by co-impregnation simultaneously with the metals or it may be present in the sulfurization feedstock. The '173 patent indicates that its catalysts which employ the particular organic additive exhibit improved activity over the comparative catalysts that do not employ an additive.

A disadvantage with some of the disclosed methods of making catalyst compositions which contain certain activity enhancing additives is that there is no real approach to selecting the appropriate additive to use except by trial and error. Also, often the groups of additive compounds disclosed in the art as having possible use in the preparation of hydroprocessing catalysts is so large that it is very difficult if not impossible to make a good selection from the group of a proper additive to use in the preparation of a catalyst.

It is, thus, an objective of the invention to provide a method of making an additive-containing composition that is particularly suitable for use in the hydroprocessing of hydrocarbon feedstocks.

Another objective of the invention is to provide a method of making a additive-containing composition, which method includes selecting from a group of organic compounds an additive that may provide for a high activity catalyst composition.

Accordingly, provided is method of making a composition, wherein said method comprises: providing a support material; selecting an organic additive from a group of organic additives, wherein said organic additive has a complexation energy and is used for incorporation thereof into said support material in the preparation of said composition that provides for a high activity catalyst composition, and wherein said selecting of said organic additive from said group is done by utilizing a correlation model for estimating a predicted catalytic activity for said high activity catalyst composition as a function of a physical property associated with each of said organic additive of said group; and incorporating said organic additive into said support material to provide said support material having incorporated therein said organic additive to thereby provide an additive-impregnated composition.

FIG. 1 presents plots of the relative volumetric activities (RVA) of various catalyst compositions, each of which was prepared by the incorporation therein of a separately selected testing additive, as a function of the characteristic complexation energy of each of the separately selected testing additives used in the preparation of the various catalyst compositions, and presented is a statistic fit of the data set.

The composition of the invention is particularly useful in applications involving the catalytic hydroprocessing of petroleum derived feedstocks, such as in the hydrotreating of atmospheric distillates, gas oils and residues and of vacuum gas oils and residues.

One embodiment of the inventive composition is a hydroprocessing catalyst composition that comprises a metals-incorporated shaped support and an organic additive selected from the group consisting of amine compounds having complexation energies of an absolute value of greater than 490 kcal/mol.

The metals-incorporated shaped support can comprise a porous refractory oxide and a hydrogenation metal component selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) may also be a desired metal component.

In another embodiment, the inventive composition comprises a support material having incorporated therein a metal component and an organic additive. A correlation model can be and is preferably used to select the organic additive that is incorporated into the composition. The correlation model provides for estimating a predicted catalytic activity of a catalyst composition containing the organic additive as a function of a selected physical property, such as complexation energy, of the organic additive.

The support material used in the preparation of the inventive catalyst composition may be any material that can suitably provide for the support of the metal hydrogenation components of the catalyst composition and which has porosity that may further be filled with the organic additive of the invention.

A porous refractory oxide is typically used as a support material component of a support material. Examples of possible suitable porous refractory oxides include silica, alumina, titania, zirconia, silica-alumina, silica-titania, silica-zirconia, titania-alumina, zirconia-alumina, silica-titania and combinations of two or more thereof. The preferred porous refractory oxide for use in the preparation of the support material of the composition of the invention is one selected from the group consisting of alumina, silica, and silica-alumina. Among these, the most preferred porous refractory oxide is alumina.

The porous refractory oxide generally may have an average pore diameter in the range of from about 50 Angstroms to about 200 Angstroms. The total pore volume of the porous refractory oxide as measured by standard mercury porosimetry methods is in the range of from about 0.2 cc/gram to about 2 cc/gram. The surface area of the porous refractory oxide, as measured by the B.E.T. method, generally exceeds about 100 m²/gram, and it is typically in the range of from about 100 to about 400 m²/gram.

The support or support material may be a shaped support comprising the porous refractory oxide that is prepared by any suitable method known to those skilled in the art. Typically, in the preparation of a shaped support the porous refractory oxide starting material is in the form of a powder and is mixed with water, and, if desired or necessary, other chemical aids such as peptizing agents or flocculating agents or binders or other compounds, to form a mixture or paste that may be formed into an agglomerate or shaped particle.

It can be desirable to extrude the mixture to form extrudates of any one or more of various shapes such as cylinders, trilobes, etc. having nominal sizes such as 1/16 inch, 1/8 inch, 3/16 inch, and etc. The agglomerate or shaped particle that comprises one or more of the previously listed inorganic oxide compounds is then dried and calcined to give the final shaped support particle used in the preparation of the inventive catalyst composition.

The shaped support particle is dried under standard drying conditions that can include a drying temperature in the range of from 50° C. to 200° C., preferably, from 75° C. to 175° C., and more preferably, from 90° C. to 150° C.

After drying, the shaped support particle is calcined under standard calcination conditions that include a calcination temperature in the range of from 250° C. to 900° C., preferably, from 300° C. to 800° C., and, most preferably, from 350° C. to 600° C.

The shaped support that has been calcined should have a surface area and pore volume that allow for the impregnation of the shaped support with the metal components and organic additive of the invention. The calcined shaped support can have a surface area (determined by the BET method employing $N_2$, ASTM test method D3037) that is in the range of from 50 m²/g to 450 m²/g, preferably, from 75 m²/g to 400 m²/g, and, most preferably, from 100 m²/g to 350 m²/g.

The mean pore diameter in angstroms (Å) of the calcined shaped support is in the range of from 50 to 200, preferably, from 70 to 150, and, most preferably, from 75 to 125.

The pore volume of the calcined shaped support should exceed 0.55 cc/g and is typically in the range of from 0.5 cc/g to 1.1 cc/g. More typically, the pore volume is in the range of from 0.6 cc/g to 1.0 cc/g, and, most typically, it is from 0.7 to 0.9 cc/g. Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the shaped support particle, which preferably has been calcined, is impregnated in one or more impregnation steps with at least one metal component using one or more aqueous solutions containing at least one metal salt wherein the metal compound of the metal salt solution is an active metal or active metal precursor. The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) may also be a desired metal component.

For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both.

For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution (metal-containing solution) is selected so as to provide the desired metal content in the final composition of the invention taking into consideration the pore volume of the support material into which the aqueous solution is to be impregnated. Typically, the concentration of metal compound in the impregnation solution is in the range of from 0.01 to 100 moles per liter.

The metal content of the shaped support having a metal component incorporated therein may depend upon the application in which the additive impregnated composition of the invention is to be used, but, generally, for hydroprocessing applications, the Group 9 and 10 metal component, i.e., cobalt or nickel, preferably, nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %.

The Group 6 metal component, i.e., molybdenum or tungsten, preferably, molybdenum, can be incorporated into the shaped support in an amount in the range of from 5 wt. % to 50 wt. %, preferably from 8 wt. % to 40 wt. %, and, most preferably, from 12 wt. % to 30 wt. %.

The above-referenced weight percents for the metal components are based on the weight of the dry shaped support and the metal component as being the element regardless of the actual form, e.g., the oxide form or sulfide form, of the metal component.

In the inventive method of preparing or making the catalyst composition of the invention, the metal-containing impregnation solution may be an aqueous solution comprising at least one metal, as described above, having a hydrogenation function. The at least one metal of the metal-containing impregnation solution may include, for example, a metal selected from the group consisting of nickel, cobalt, molybdenum, tungsten and any combination of two or more thereof, and is incorporated into the support material or shaped support to thereby provide a metal-incorporated support.

The incorporation of the metal-containing impregnation solution into the support material or shaped support may be done by any suitable means or method known to those skilled in the art. One such method may include standard impregnation by incipient wetness or even soaking the support material or shaped support with an excess amount of the metal-containing impregnation solution than would otherwise be used in a dry impregnation or an incipient wetness impregnation.

The metal-incorporated support undergoes a drying step by which at least a portion of the volatiles content is driven from the metal-incorporated support but leaving the metals behind upon the surface of the support material. The removal of at least a portion of the volatiles from the metal-incorporated support opens up pore volume which in a later preparation step is filled with an organic additive. The metal-incorporated support, thus, is dried under drying conditions that include a drying temperature.

In one embodiment of the inventive method, the drying temperature may be less than a calcination temperature. In this embodiment, the drying temperature under which the step of drying the metal-incorporated support is conducted does not exceed a calcination temperature. Thus, the drying temperature should not exceed 400° C., and, preferably, the drying temperature at which the metal-incorporated support is dried does not exceed 300° C., and, most preferably, the drying temperature does not exceed 250° C.

The drying of the metal-incorporated support may also be controlled in a manner so as to provide the resulting dried metal-incorporated support that has a volatiles content in a particular range. The volatiles content of the dried metal-incorporated support should, in this case, be controlled so that it does not exceed 20 wt. % LOI. It is preferred for the LOI of the dried metal-incorporated support to be in the range of from 1 wt. % to 20 wt. % LOI, and, more preferred, from 3 wt. % to 15 wt. % LOI.

LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure).

To provide the additive impregnated composition, the organic additive of the invention is incorporated into the support material by filling a significant portion and up to the available pore volume of the pores of the support material with the organic additive. This is done by using any suitable method or means to impregnate or incorporate the support material with the organic additive. In a preferred method, the support material is filled with organic additive by any of the standard well-known pore fill methodologies whereby the pore volume is filled by taking advantage of capillary action to draw liquid into the pores of the support material. It is desirable to fill at least 75% of the available pore volume of the support material with the organic additive, and, preferably, at least 80% of the available pore volume is filled with the organic additive. Most preferably, at least 90% of the available pore volume of the support material is filled with the polar additive.

An important feature of certain embodiments of the invention is the use of a correlation model in the selection of the organic additive that is incorporated into the support material and used in the preparation of the additive impregnated composition. The correlation model provides for an estimation of a predicted catalytic activity for a high activity catalyst composition as a function of a physical property that may be used to characteristize the impregnated polar additive. One particular physical property that has been found to correlate well with catalytic activity is the complexation energy of organic additives. It is understood, however, that other physical properties may be used as well to generate the correlation model.

One method of generating the correlation model of the invention includes preparing a plurality of additive impregnated compositions that are to be tested, e.g., testing catalyst compositions, to determine their catalytic activity. Each of the testing catalyst compositions is to be prepared using a separate or different organic additive from those of the other testing catalyst compositions. Each of the organic additives may be characterized by its own unique value for one of its characteristic physical properties, such as its complexation energy.

The catalytic activity of each of the testing catalyst compositions is then measured using any suitable means or method known to those skilled in the art for testing or determining the activity of a catalyst composition. In a preferred embodiment of the invention, the hydrodesulfurization activity of each of the testing catalyst compositions is measured.

The measurement of the activity of each of the testing catalyst compositions provides for the generation of a data set that includes the catalytic activity of each of the testing catalyst compositions versus a value representative of a particular physical property of the organic additive that is impregnated into the given testing catalyst composition. With this data set, a correlation model of the catalytic activity and the physical property characteristic is generated. This correlation model can provide for estimating a predicted catalytic activity of a high activity catalyst composition as a function of a physical property of organic additives, and it can provide for the efficient selection of appropriate organic additives for use in the manufacture of additive impregnated and high activity catalyst compositions.

The organic additive that may be used in the preparation of the additive impregnated composition of the invention can be any suitable molecule that provides for the desired catalytic benefits and enhancements as are described herein. It has been discovered that one physical characteristic that is predictive of or correlatable with the catalytic effect of the organic compounds to be used as an impregnation additive of hydrodesulfurization catalysts that comprise one or more hydrogenation metals supported on alumina is the complexation energy of the organic additive.

It has been found that complexation energy of an organic additive tends to correlate well with the hydrodesulfurization catalytic activity of the additive-impregnated composition. The complexation energy of a compound, as the term is understood to mean in this specification, is the enthalpy of reaction of a metal complex that includes a metal cation, such as a nickel cation or a cobalt cation, and a ligand.

To illustrate complexation energy, as the term is used in this specification, reference is made to the organic additive, ethylenediamine, which may form a complex with a nickel cation. In this example, the enthalpy of reaction, or complexation energy, may be represented as the total energy of the metal complex, $[(Ni(C_2H_4(NH_2)_2)_3]^{2+}$, less the total energy of the nickel cation, $[Ni]^{2+}$, and of the ligands, $[C_2H_4(NH_2)_2)]$, of the complex.

A desirable feature of the organic additive of the invention is for it to be capable of forming with a transition metal, such as nickel or cobalt, a metal complex. Therefore, the molecular structure of the organic additive should, preferably, provide for binding with a metal cation of either nickel or cobalt to form a metal complex.

Examples of classes of compounds from which the organic additive of the invention may be selected include amide (including formamide) compounds, amine compounds, nitrile compounds, pyrrolidone compounds, urea compounds, and oxalate compounds. Among these compounds the preferred classes of compounds from which the organic additive is selected are amine compounds, amide compounds and oxalate compounds.

The preferred amine compounds include long chain amines, including primary, secondary, and tertiary amines, and those containing from one carbon to 20 carbons, with the carbon chains being either saturated or unsaturated. One particularly preferred amine compound that may be used as an organic additive of the invention is octylamine.

The preferred amide compounds include those of the formamide series of formamide, methylformamide, dimethylformamide and diethylformamide. Among these, particularly beneficial formamide compounds include diethylformamide and dimethylformamide.

As already noted, the complexation energy of the organic additive may be used as an indicator of the catalytic benefit that can be provided by the organic additive when it is used as a component of the catalyst composition of the invention. It has been found that for certain organic compounds, which may act or function as a ligand in the formation of a transition metal complex, the catalytic activity of an additive impregnated composition used in the hydrotreatment of hydrocarbon feedstocks increases with increases in the complexation energy of the organic additive.

To provide for a minimum level of catalytic benefit, the organic additive selected for use in the additive impregnated composition of the invention ought to have a complexation energy of an absolute value of greater than 470 kcal/mol. It preferred for the organic additive to have a complexation energy of an absolute value of greater than 490 kcal/mol, and more preferred, the complexation energy can have an absolute value of greater than 500 kcal/mol.

The complexation energy of an organic additive may be determined by calculation using the publicly available, under license, computer software program named Materials Studio, version 4.4, copyright December 2008, distributed by Accelrys Inc. (Accelrys, Inc. 10188 Telesis Court, Suite 100, San Diego, Calif. 92121, USA), or the complexation energy may be determined by any other method recognized by those skilled in the art for calculating the complexation energy of a ligand compound and which such method will provide values for complexation energy that approximate those generated by the use of the Materials Studio software.

Following is a brief discussion of some of the technical principles behind the computation method and the application of the Materials Studio computer software program used for calculating complexation energy of an organic additive compound. The total energy of the metal complex, metal cation and ligand that form a complex is calculated from first principles using density functional theory as implemented in the computer modeling code $DMol^3$. $DMol^3$ (B. Delley, *J. Phys. Chem. A* 110 (2006) 13632) is one of the Materials Studio software codes. To use this model, the parameters needed to perform the calculations within the $DMol^3$ program are first selected.

The NLSD functional BLYP, consisting of the Becke exchange functional (B88) and the Lee-Yang-Parr correlation functional, are used. To obtain the electronic groundstate of the complex, a spin-unrestricted formulism is employed with the formal charges being used to set the initial spins of the atomic centers. The net charge of the complex is set to 2+ to coincide with the oxidation state of the nickel cation. A full geometry optimization of the model structures is performed using the medium setting for the quality of the convergence criteria. Medium settings are used to specify the criteria for the orbital cutoffs, the convergence criteria for the self-consistent field (SCF) calculation, and the precision used in the numerical integration of the Hamiltonian. Finally, an effective core potential (ECP) basis set is used at the double numerical with polarization functions (DNP) level of accuracy. With the selection of the above described parameters, the Materials Studio software may be run to generate complexation energy of the give organic additive.

The additive-impregnated composition of the invention may be treated, either ex situ or in situ, with hydrogen and with a sulfur compound. One of the beneficial features of the invention is that a non-sulfurized composition may be loaded into a reactor in which it can be activated, in situ, by a hydrogen treatment step followed by a sulfurization step.

The hydrogen treatment includes exposing the additive-impregnated composition to a gaseous atmosphere containing hydrogen at a temperature ranging upwardly to 250° C. Preferably, the additive-impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar.

The additive impregnated-composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the additive-impregnated composition after it has been treated with hydrogen can be done using any conventional method known to those skilled in the art. Thus, the hydrogen treated additive-impregnated composition can be contacted with a sulfur-containing compound, which can be hydrogen sulfide or a compound that is decomposable into hydrogen sulfide, under the contacting conditions of the invention.

Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen-treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen-treated, additive-impregnated composition to their sulfided form. Typically, the sulfiding temperature at which the hydrogen treated additive impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated additive impregnated composition is sulfided generally can be in the range of from 1 bar to 70 bar, preferably, from 1.5 bar to 55 bar, and, most preferably, from 2 bar to 35 bar.

One of the benefits provided by the additive impregnated composition of the invention is that it can be utilized in a reactor system that is started up using a so-called delayed feed introduction procedure. In the delayed feed introduction procedure, the reactor system, which includes a reactor vessel containing the additive-impregnated composition, first undergoes a heating step to raise the temperature of the reactor and the additive-impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the additive-impregnated composition, it is thereafter treated with a sulfur compound in the manner as earlier described herein.

It is recognized that the additive impregnated composition of the invention, after its treatment with hydrogen and sulfur, is a highly effective catalyst for use in the hydrotreating of hydrocarbon feedstocks. This catalyst is particularly useful in applications involving the hydrodesulfurization of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the additive impregnated composition, which is preferably used in a delayed feed introduction procedure or otherwise treated with hydrogen and sulfur, as described above, is contacted under suitable hydrodesulfurization conditions with a hydrocarbon feedstock that typically has a concentration of sulfur.

The more typical and preferred hydrocarbon feedstock is a petroleum middle distillate cut having a boiling temperature at atmospheric pressure in the range of from or about 140° C. to or about 410° C. These temperatures are approximate initial and boiling temperatures of the middle distillate.

Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds.

Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw).

It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The additive impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature.

Such suitable reaction systems can include fixed catalyst bed systems, ebullating catalyst bed systems, slurried catalyst systems, and fluidized catalyst bed systems.

The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

The flow rate at which the distillate feedstock is charged to the reaction zone of the inventive process is generally such as to provide a liquid hourly space velocity (LHSV) in the range of from $0.01$ hr$^{-1}$ to $10$ hr$^{-1}$.

The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged.

The preferred LHSV is in the range of from $0.05$ hr$^{-1}$ to $5$ hr$^{-1}$, more preferably, from $0.1$ hr$^{-1}$ to $3$ hr$^{-1}$ and, most preferably, from $0.2$ hr$^{-1}$ to $2$ hr$^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to $1781$ m$^3$/m$^3$ (10,000 SCF/bbl). It is preferred for the treat gas rate to be in the range of from $89$ m$^3$/m$^3$ (500 SCF/bbl) to $1781$ m$^3$/m$^3$ (10,000 SCF/bbl), more preferably, from $178$ m$^3$/m$^3$ (1,000 SCF/bbl) to $1602$ m$^3$/m$^3$ (9,000 SCF/bbl), and, most preferably, from $356$ m$^3$/m$^3$ (2,000 SCF/bbl) to $1425$ m$^3$/m$^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

The following examples are presented to further illustrate certain aspects of the invention, but they are not to be construed as limiting the scope of the invention.

EXAMPLE 1

This Example 1 describes the standard procedure used in the preparation of each of the catalyst compositions that was impregnated with a separately selected organic additive each of which having a characteristic complexation energy. Each of the catalyst compositions impregnated with its particular organic additive was tested as described in Example 2 to determine its relative catalytic activity.

100 weight parts of 1.3 mm Trilobe extrudate alumina support was impregnated with an aqueous solution of molybdenum, cobalt, and phosphorous so as to provide a base catalyst composition that, after drying and calcination, contained 14.8 wt. % molybdenum, 4.2 wt. % cobalt, and 2.4 wt. % phosphorous, with the weight percents being based on dry catalyst weight.

The impregnation solution used for incorporating the metal components into the alumina support was prepared by mixing 33.4 weight parts molybdenum trioxide ($MoO_3$), 10.1 weight parts cobalt hydroxide ($Co(OH)_2$), 13.3 weight parts phosphoric acid ($H_3PO_4$), and 100 weight parts deionized water. These mixed ingredients were heated to approximately 93° C. (200° F.) in order to dissolve the components and provide a clear liquid. The cooled solution was then further diluted with deionized water to provide the desired impregnation volume for impregnating the extrudate alumina support.

After the impregnation of the alumina support with the metals solution and its aging, the impregnated extrudate was dried and calcined to provide the base catalyst composition to be impregnated with the organic additive.

A plurality of catalyst compositions were prepared for testing each by impregnating an aliquot portion of the base catalyst with one of the selected testing additives (organic additives) listed in the following Table 1 in an amount such as to have filled 90% of the pore volume of the aliquot portion of the base catalyst. The additive-impregnated catalyst composition was then allowed to age at ambient temperature before loading into a testing reactor for testing and measuring catalytic performance as described in Example 2.

TABLE 1

Selected Physical Properties, Including Complexation Energy, of Organic Additives.

| Compound | Formula | Class | Boiling Point (° C.) | Complexation Energy (kcal/mol) |
| --- | --- | --- | --- | --- |
| Dimethylformamide | $C_3H_7NO$ | Amide | 153 | −517.3 |
| n-methylpyrrolidone | $C_5H_9NO$ | Cyclic-amide | 202 | −518.0 |
| Tetramethylurea | $C_5H_{12}N_2O$ | Diamine | 174-178 | −503.4 |
| Acetonitrile | $C_2H_3N$ | Nitrile | 82 | −501.4 |
| Adiponitrile | $(CH_2)_4(CN)_2$ | dinitrile | 295 | −491.5 |
| Triethylphosphate | $C_6H_{15}O_4P$ | Phosphate | 215-216 | −481.2 |
| Triethylphosphite | $C_6H_{15}O_3P$ | Phosphite | 156 | −466.4 |
| Ethylenediamine | $C_2H_8N_2$ | Diamine | 116 | −485.6 |
| Formamide | $CH_3NO$ | Amide | 210 | −492.2 |
| Octylamine | $C_8H_{19}N$ | Amine | 175-176 | −532.4 |
| 1-pentanol | $C_5H_{12}O$ | Alcohol | 138 | −469.0 |
| Diethylformamide | $(CH_3)_2NC(O)H$ | Amide | 153 | −532.7 |
| methylformamide | $CH_3NHCHO$ | Amide | 198-200 | −517.3 |

EXAMPLE 2

This Example 2 describes the procedure for testing the catalytic activity of each of the additive-impregnated catalyst compositions described in Example 1 to generate a data set of catalytic activity versus the complexation energy of the organic additive.

Trickle flow micro-reactors were used to test the hydrodesulfurization activity of additive-impregnated compositions. A 50 cc volume, based on compacted bulk density of whole pellets, of each additive-impregnated composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing sulfur spiking agent to provide a sulfur content of 2.5%.

The activities (relative activities) of the additive-impregnated compositions were tested by charging the catalyst filled reactor described above with a straight run gas oil feedstock of a diesel boiling range having a sulfur content. The reactors were operated at a pressure of 600 psig, at a rate so as to provide a liquid hourly space velocity (LHSV) of 1.0 $hr^{-1}$. The hydrogen gas rate charged to the reactor was 1200 scf $H_2$/bbl. The weight average bed temperature (WABT) was adjusted to a temperature in the range of 349° C. (660° F.) to 354° C. (670° F.).

Rate constants were determined for each of the additive-impregnated compositions assuming a reaction order of 1.3. The relative volumetric activity (RVA) for each of the additive-impregnated compositions was determined relative to the particular additive-impregnated composition containing dimethyleformamide (DMF) using the formula: $RVA=(K_{exp}/K_{ref})\times100$; where $K_{exp}$ is the reaction rate coefficient of the particular tested additive-impregnated composition, and $K_{ref}$ is the reaction rate coefficient of the reference additive-impregnated composition, i.e., the DMF impregnated composition.

The RVA determined for each of the additive-impregnated compositions is presented in the following Table 2.

TABLE 2

RVA of Additive-Impregnated Catalyst Compositions

| Compound | RVA |
| --- | --- |
| Dimethylformamide | 1 |
| n-methylpyrrolidone | 1.05 |
| Tetramethylurea | 0.95 |
| Acetonitrile | 0.825 |
| Adiponitrile | 0.845 |
| Triethylphosphate | 0.8 |
| Triethylphosphite | 0.6 |
| Ethylenediamine | 0.7 |
| Formamide | 0.72 |
| Octylamine | 1.28 |
| 1-pentanol | 0.7 |
| Diethylformamide | 1.14 |
| Methylformamide | 0.9 |

From the data set of RVA versus complexation energy a correlation model was generated. The correlation model was obtained by use of a partial least squares (PLS) analysis of the data set. FIG. 1 presents the results of the activity testing of the additive impregnated compositions and the statistical fitting of the data set. There is clearly a close correlation between RVA of the additive-impregnated compositions and the complexation energies of the additives used in the preparation of the additive-impregnated compositions.

That which is claimed is:

1. A method of making a composition, wherein said method comprises:
    providing a support material;
    selecting an organic additive from a group of organic additives, wherein said organic additive has a complexation energy and is used for incorporation thereof into said support material in the preparation of said composition that provides for a high activity catalyst composition, and wherein said selecting of said organic additive from said group is done by utilizing a correlation model for estimating a predicted catalytic activity for said high activity catalyst composition as a function of an associated complexation energy associated with each of said organic additive of said group; and
    incorporating said organic additive into said support material to provide said support material having incorporated therein said organic additive to thereby provide an additive-impregnated composition.

2. A method as recited in claim 1, which further comprises: incorporating a metal-containing solution into said support material to provide said support material having incorporated therein a metal component.

3. A method as recited in claim 2, which further comprises: prior to said incorporating of said organic additive into said support material, drying said support material having incorporated therein said metal component so as to provide for a volatiles content therein that is in the range of from 1 to 20 wt. % LOI.

4. A method as recited in claim 3, which further comprises: contacting said additive-impregnated composition under suitable hydrogen treatment conditions with hydrogen to thereby provide a hydrogen-treated composition.

5. A method as recited in claim 4, which further comprises: contacting said hydrogen-treated composition under suitable sulfur treatment conditions with a sulfur compound to thereby provide a sulfided composition.

6. A method as recited in claim 5, which further comprises: preparing a plurality of testing catalyst compositions, wherein each of said testing catalyst compositions of said plurality of testing catalyst compositions is prepared with a separately selected testing additive, and wherein each of said separately selected testing additive has a characteristic complexation energy;
    determining a catalytic activity for each of said testing catalyst compositions of said plurality of testing catalyst compositions to generate a data set of said catalytic activity versus said characteristic complexation energy; and
    generating said correlation model using said data set, wherein said correlation model is a correlation between said catalytic activity and said characteristic complexation energy, and wherein said correlation model provides for estimating said predicted catalytic activity of said high activity catalyst composition that has been prepared with said organic additive having said complexation energy.

7. A method as recited in claim 6, wherein said organic additive is selected from a group consisting of amine compounds and said complexation energy of said organic additive has an absolute value of greater than 490 kcal/mol.

8. A method as recited in claim 7, wherein said additive-impregnated composition comprises said metal component selected from the group of Group 9 or Group 10 metals consisting of cobalt and nickel present in said additive impregnated composition in an amount in the range of from 0.5 wt.% to 20 wt.%, and Group 6 metals consisting of molybdenum and tungsten present in said additive impregnated composition in an amount in the range of from 5 wt. % to 50 wt. %, wherein the weight percents are based on the weight of the dry support material with the metal component as the elemental form regardless of its actual form.

9. A method as recited in claim 8, wherein said support material is a shaped support comprising a porous refractory oxide selected from the group of refractory oxides consisting of silica, alumina, titania, zirconia, silica-alumina, silica-titania, silica-zirconia, titania-alumina, zirconia-alumina, silica-titania and combinations of two or more thereof; and wherein said shaped support has a surface area (as determined by the BET method) in the range of from 50 m2/g to 450 m2/g, a mean pore diameter in the range of from 50 to 200 angstroms (Å), and a total pore volume exceeding 0.55 cc/g.

10. A method as recited in claim 9, wherein at least 75% of the available pore volume of said support material is filled with said organic additive.

* * * * *